United States Patent [19]

Hardy, II

[11] Patent Number: 5,608,222

[45] Date of Patent: Mar. 4, 1997

[54] ANALOG TO DIGITAL CONVERSION TECHNIQUE FOR SPECTROSCOPY

[76] Inventor: William H. Hardy, II, 12633 Red Canyon Rd., Knoxville, Tenn. 37922

[21] Appl. No.: 418,506

[22] Filed: Apr. 7, 1995

[51] Int. Cl.⁶ .................................................. G01T 1/36
[52] U.S. Cl. .................................. 250/369; 250/370.06
[58] Field of Search .............................. 250/370.06, 369

[56] References Cited

U.S. PATENT DOCUMENTS

| | | | |
|---|---|---|---|
| 3,386,096 | 5/1968 | Lundgreen et al. | 343/106 |
| 3,938,188 | 2/1976 | Fletcher et al. | 340/347 |
| 4,822,169 | 4/1989 | Distl et al. | 356/364 |
| 4,866,615 | 9/1989 | Ichihara | 364/413.24 |
| 5,010,339 | 4/1991 | Giangano et al. | 341/164 |
| 5,067,090 | 11/1991 | Seeman | 364/486 |
| 5,218,208 | 6/1993 | Augier et al. | 250/363.02 |
| 5,307,299 | 4/1994 | Stein et al. | 364/728.01 |
| 5,347,129 | 9/1994 | Miller et al. | 250/336.1 |
| 5,465,284 | 11/1995 | Karellas | 378/62 |

OTHER PUBLICATIONS

Nuclear Instruments and Methods, "A New Method of Analog to Digital Conversion", Cottini, et al., 24 (1963) 241–242.

Nuclear Instruments And Methods In Physics Research, "An Analog–To–Digital Converter Module For Nuclear Spectroscopy", Correia, et al., A235 (1985) 536–241.

Nuclear Instruments And Methods In Physics Research, "A New Sliding Scale Principle And The Spectroscopic ADC Based On This Principle", Xianjie, et al., A259 (1987) 521–524.

IEEE Transactions In Nuclear Science, "Signal Processing For Semiconductor Detectors", Goulding, NS–29 (3 Jun. 1982) P1125.

IEEE Transactions In Nuclear Science, "Linear Unipolar Pulse–Shaping Networks: Current Technology", Fairstein, vol. 37, No. 2, Apr. 1990.

*Primary Examiner*—Constantine Hannaher
*Attorney, Agent, or Firm*—Andrus, Sceales, Starke & Sawall

[57] ABSTRACT

An analog to digital conversion technique for spectroscopy enables the use of detectors in which resolution varies as a function of energy, and analog to digital converters with relatively poor differential linearity without sacrificing the ability to determine the locations and magnitude of peaks within a spectrum. A transfer function that characterizes the dependence of the resolution of the system is used to convert data before the data is displayed in a histogram. The transfer function can also characterize repeatable non-linearities in the system. The invention is particularly useful for gamma ray spectroscopy with sodium iodide detectors. The transform function can be implemented in a digital circuit, an analog circuit, or in a firmware or software transform table.

34 Claims, 9 Drawing Sheets

5,608,222

ANALOG TO DIGITAL CONVERSION TECHNIQUE FOR SPECTROSCOPY

FIELD OF THE INVENTION

The invention relates to an analog to digital conversion technique for spectroscopy that uses energy dependent resolution properties of the system to achieve compression of histogram data.

BACKGROUND OF THE INVENTION

FIG. 1 shows a conventional gamma ray spectroscopy system 10. A source of high voltage 12 provides power to a detector 14. A gamma ray 16 emitted from a source of nuclear decay is converted by the detector 14 into an electrical analog pulse signal in line 18. The analog pulse signal is typically amplified in a preamplifier 20, shaped in a shaping amplifier 22, and stretched in a pulse stretcher 24. After the analog pulse signal is amplified, shaped, and stretched, it is converted into a digital signal by an analog to digital converter 26. The analog to digital converter (ADC) outputs an n-bit distal signal (e.g., a 12-bit digital signal) in line 27. The digital signal in line 27, which in gamma ray spectroscopy represents the energy of the detected gamma ray, is then counted in a binning scheme to produce a histogram 30, i.e. an energy spectrum of the incoming gamma rays.

A hardware implemented binning scheme is shown in FIG. 1, although binning schemes can also be implemented in software or firmware. In FIG. 1, the N-bit digital signals in line 27 input to an add-one circuit 28. The add-one circuit 28 outputs a digital binning signal in line 29 that includes a memory address, and instructions to increment the data in a memory channel at the address by a count of one. The digital binning signal in line 29 from the add-one circuit 28 inputs random access memory (RAM) 31, and consequently increments data in the appropriate memory channel. The raw data in the RAM 31 can be displayed as a histogram 30 on a display screen.

In an ideal spectroscopy system, an exact linear relationship would exist between the input radiation 16 and the measured histogram 30. All events of a particular type (e.g., emitted gamma rays having a specific energy) would fall in the same bin or channel of the histogram 30. Such an ideal histogram might look like the histogram shown in FIG. 2.

Conventional ADCs 26 convert analog pulse signals into digital pulse signals by sorting the analog pulse signals into one of a number of contiguous channels. The particular channel (i.e. the particular value of the digital pulse signal) depends upon the value of the analog pulse signal, but also on the differential linearity or width of the channels in the ADC 26. It is generally believed that the channels in the ADC should have equal or near equal width for nuclear spectroscopy to be accurate enough for useful analysis.

In order to achieve a near ideal histogram 30, a variety of ADC techniques have been developed to accurately and quickly convert analog pulses to digital values. Spectroscopy grade ADCs have been designed to improve the differential linearity of the ADC (i.e. ensure that the channels have equal width across the spectrum). However, even with an expensive spectroscopy grade ADC having very good differential linearity, the histogram will not be accurate if non-linearities are present in the detector or elsewhere.

Detectors used for detecting gamma rays in nuclear spectroscopy systems include: Geiger-Müller tubes, sodium iodide scintillation detectors, plastic scintillators, silicon (lithium) detectors, gas flow proportional counters, germanium (lithium) detectors and hyper-pure germanium detectors. Geiger-Müller tubes are very inexpensive but have essentially no energy resolution. That is, an analog pulse signal from a Geiger-Müller tube does not differentiate between incoming gamma rays according to energy. In contrast, hyper-pure germanium detectors have excellent resolution and are extremely linear in terms of energy over a wide variety of energies. However, hyper-pure germanium detectors can cost tens of thousands of dollars, require liquid nitrogen for cryogenic cooling, and are physically large.

Sodium iodide scintillation detectors, and many other scintillation-type detectors, have reasonable energy resolution, are rugged, do not require cryogenic cooling, are physically small and have a reasonably low cost. Sodium iodide detectors are therefore desirable for use in many applications in medicine, radiation surveying, waste monitoring, and education. Unfortunately, sodium iodide detectors suffer from a variety of problems:

1) The pulse height of the analog pulse signal from a sodium iodide detector is not normally proportional to the energy of the incoming gamma ray below approximately 200 keV (i.e. integral non-linearity), 2) A mono-energetic gamma ray source will produce a peak with substantial width (i.e., a sodium iodide detector has only fair energy resolution), and 3) The resolution of the sodium iodide detector is a significant function of energy (i.e., low energy peaks are much narrower than high energy peaks).

Despite these problems, much effort has gone into sodium iodide spectroscopy. In the low energy region of the spectrum, peaks are normally 5 to 7 keV in Full Width at Half Maximum (FWHM), so each channel of the histogram needs to represent 0.5 to 2.0 keV to be acceptable for analysis. With conventional spectroscopy ADCs in which each channel has the same width, an ADC needs at least 1000 to 4000 channels to cover a spectrum from 0 to 2000 keV. In such a sodium iodide system, high energy peaks have a resolution of 100 to 120 keV FWHM. Such a peak would cover 50 to 200 channels in a system with 1000 to 4000 channels. If weak signals are present, it may be difficult to locate peaks at high energies. Some have used lower resolution ADCs to overcome the problem with weak peaks at high energies, but this sacrifices sufficient resolution to analyze low energy data.

Historically, the focus on sodium iodide spectroscopy has been on producing electronics that are more precise and more linear, so that the spectrum can be captured in detail, and the results can be unraveled by sophisticated analysis, usually in a laboratory. Also, as mentioned above, new detector technologies with better linearity and better resolution over the entire range of interest have been developed, but these systems are bulky, expensive, and difficult to operate.

It is therefore desirable to provide a practical system of spectroscopy that allows the use of sodium iodide detectors, or other similar detectors, without sacrificing system performance.

SUMMARY OF THE INVENTION

The invention provides an approach to spectroscopy that facilitates the use of detectors in which the resolution varies as a function of energy (such as sodium iodide detectors), without sacrificing system performance in terms of ability to determine the energy of gamma rays associated with a peak, or the number of gamma rays in a peak. The invention allows this to be done without requiring the use of expensive spectroscopy grade ADCs.

As applied to a gamma ray nuclear spectroscopy system, the invention involves sensing a plurality of gamma rays from a source of radiation and generating a signal corresponding to each gamma ray sensed. The magnitude of the generated signal represents a measured value for the energy of the gamma ray. The signals are then mapped through a transfer function to generate binning signals. The transfer function characterizes the energy dependence of the resolution of the system, and also preferably repeatable non-linearities in the system, as a function of gamma ray energy. The preferred transfer function provides peaks across the energy spectrum having a constant width in terms of FWHM. Histogram data is stored in a plurality of memory channels in accordance with the binning signals. The histogram data is then stored in permanent memory and/or displayed on a screen display for analysis by a user. The above-described method can be implemented in an analog circuit or a digital circuit. The invention can also be implemented in a firmware or software embodiment. In the firmware and software embodiments, the data is stored in memory channels in the conventional manner and the non-linear transfer function operates on the data stored in the memory channels to generate histogram data.

Analog to digital conversion techniques for spectroscopy in the past such as the Wilkinson ADC and the Gatti slider have focused on achieving very high differential linearity. In contrast, the invention does not attempt to achieve high differential linearity, but rather optimizes the amount of information per channel in the ADC. The result is a conversion technique with significantly fewer channels for data, lower cost to implement, and uniform information density achieved through the use of non-constant channel widths.

In the invention, the effective ADC channel width is adjusted to be proportional to the resolution of the detector at the characteristic parameter (e.g. the corresponding energy). In this manner, each peak along the spectrum has the same width, and peaks across the entire spectrum are easier to analyze by the user.

In another aspect, the invention relates to a method of determining the transfer function that characterizes the dependence of the resolution of the system (and also preferably non-linearities in the system) as a function of the characteristic parameter (e.g. in gamma ray spectroscopy, the characteristic parameter is the energy of the gamma rays). The method involves sensing a plurality of gamma rays from a known source of radiation in which gamma rays occur across the full energy range of interest. The next step is to generate an analog pulse signal in response to each gamma ray sensed and convert the analog pulse signal into digital binning signals with a spectroscopy grade analog to digital converter having a high degree of differential linearity. Data is then stored in a plurality of memory channels in accordance with the digital binning signals. From the stored data, the transfer function is developed by matching the stored data to an ideal spectrum for the known source of radiation and scaling the energy axis so that the width of the peaks is constant across the entire energy range of interest.

DETAILED DESCRIPTION OF THE INVENTION

Figure 1:
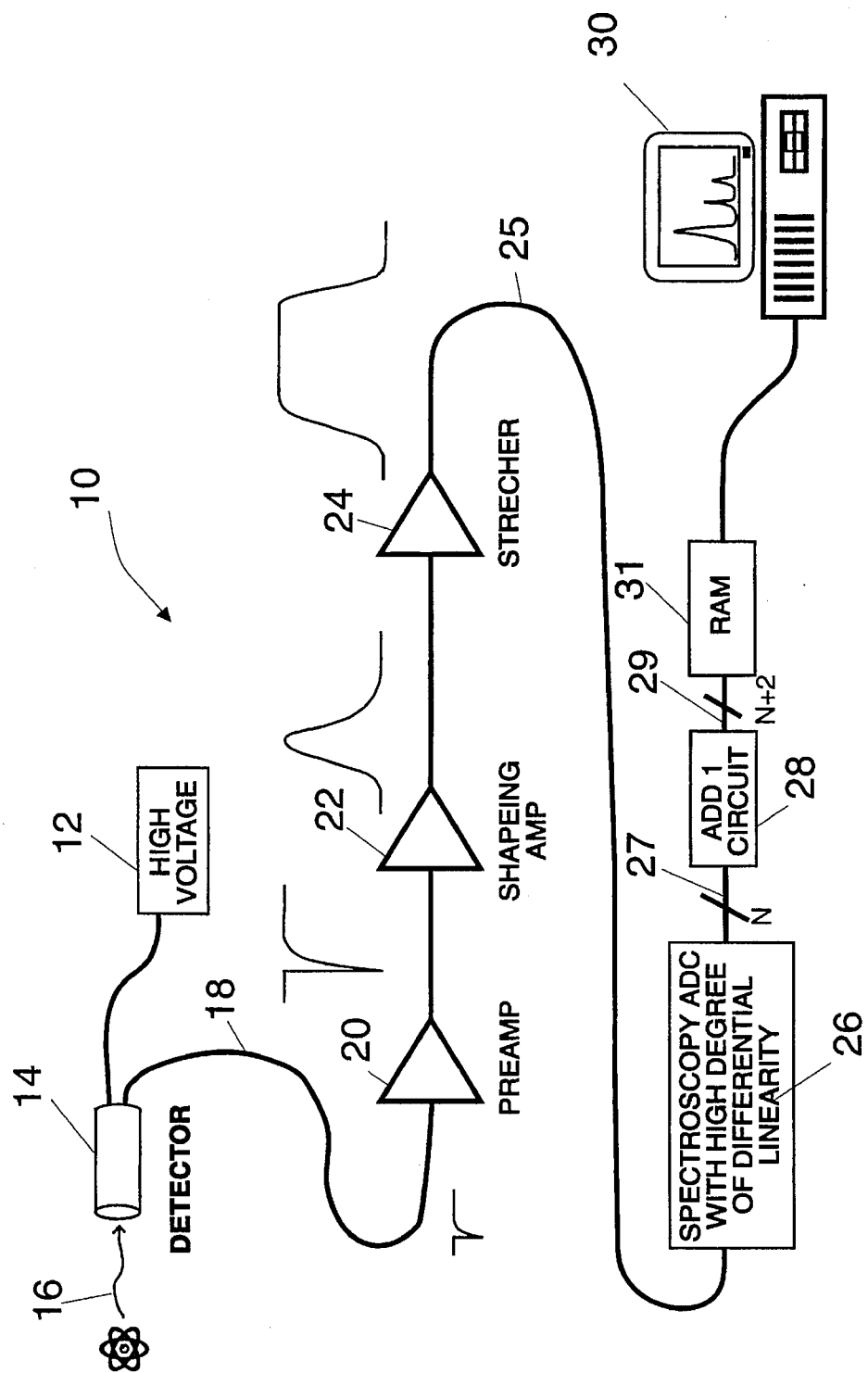
FIG. 1 is a schematic diagram of a prior art gamma ray nuclear spectroscopy system.
Figure 2:
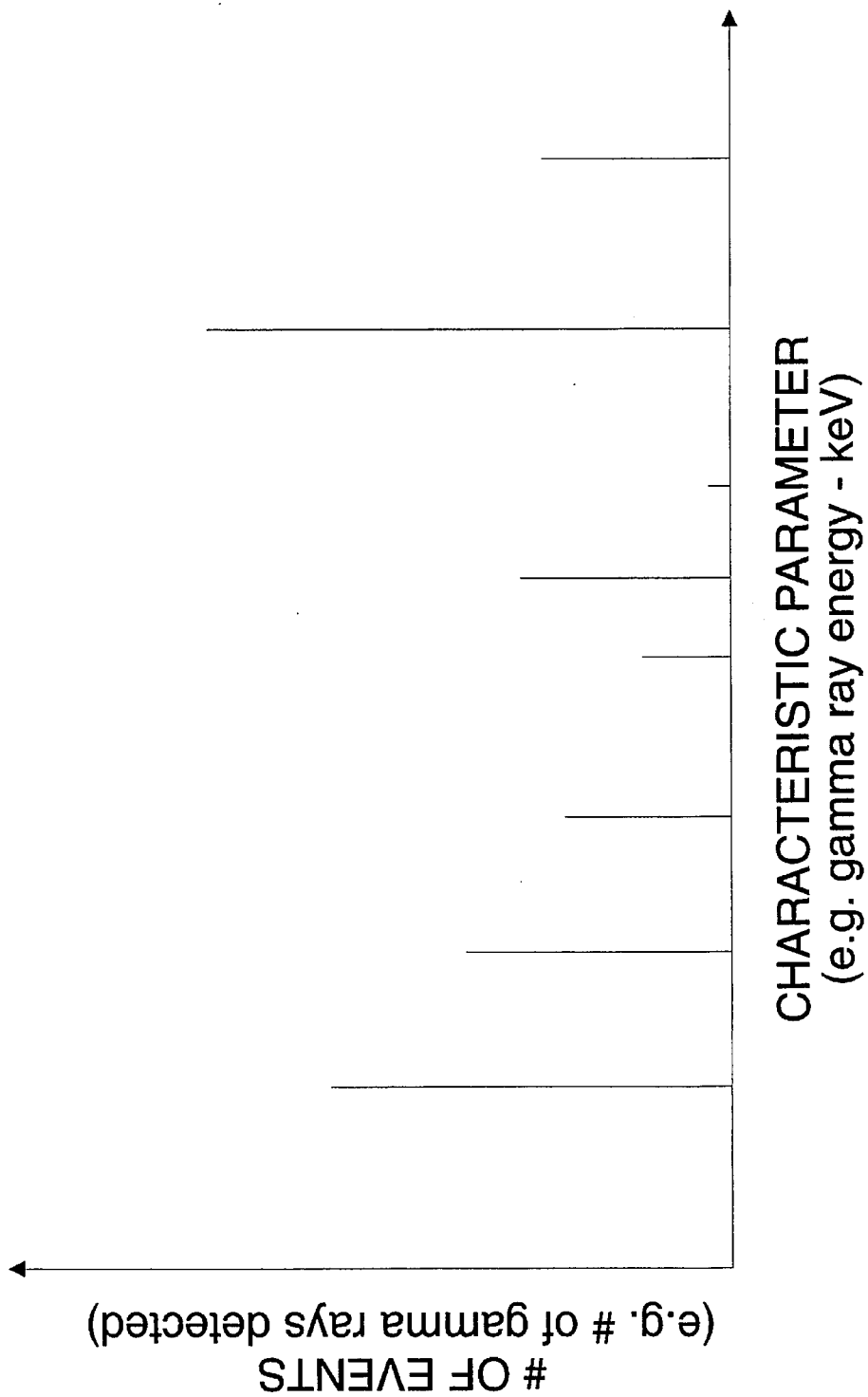
FIG. 2 is an ideal histogram that would be generated by an ideal gamma ray nuclear spectroscopy system.
Figure 3:
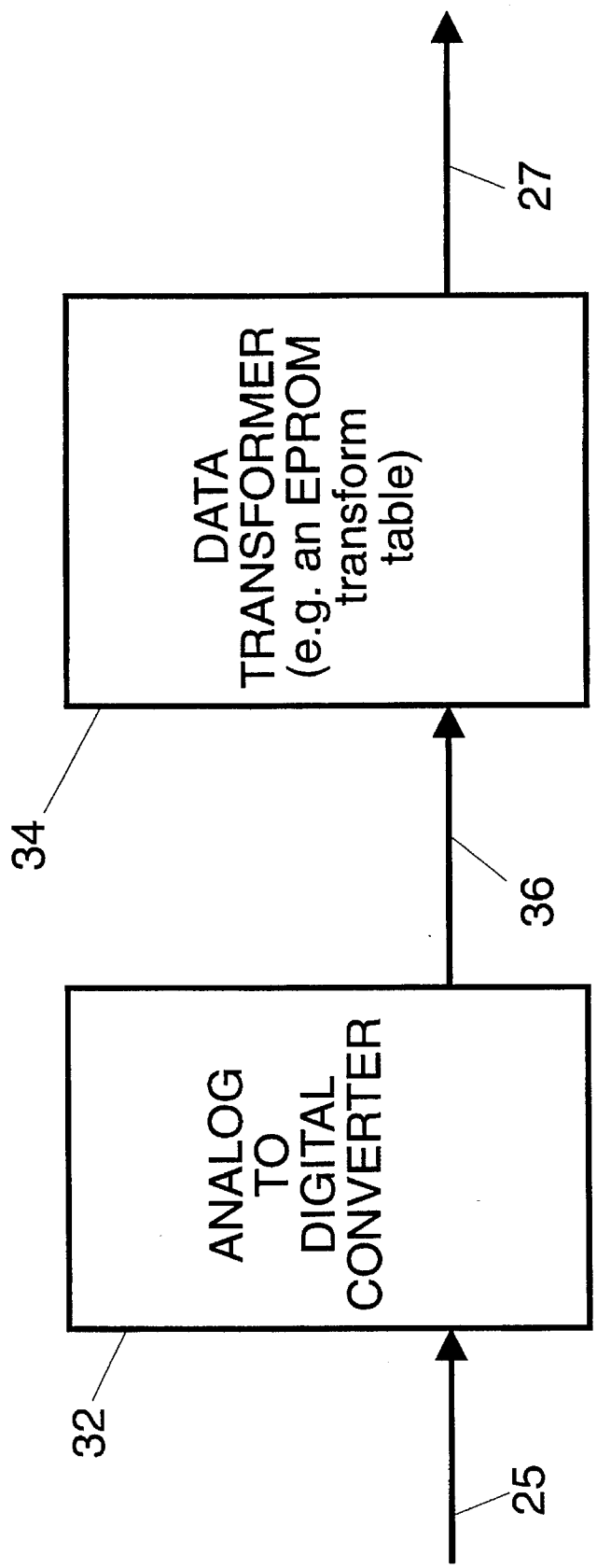
FIG. 3 is a block diagram of a digital circuit embodiment of an analog to digital conversion technique in accordance with the invention.

FIG. 3 shows an analog to digital conversion technique in accordance with the preferred embodiment of the invention, which accomplishes the conversion in a digital circuit. In particular, FIG. 3 shows an analog to digital converter 32 and a data transformer 34 which together can replace the analog to digital converter 26 shown in the prior art system 10 of FIG. 1 to carry out the invention. An analog pulse signal inputs the analog to digital converter 32 through line 25. The analog pulse signal is preferably amplified, shaped and stretched to provide a stable analog pulse signal for analog to digital conversion as described in FIG. 1. The analog to digital converter (ADC) 32 is preferably a 12-bit (i.e. 4096 channels) successive approximation analog to digital converter. It is not necessary that the ADC 32 be a spectroscopy grade ADC with a high degree of differential linearity. This is in contrast to the high resolution spectroscopy grade ADC 26 shown in FIG. 1 as part of the conventional spectroscopy system which has a high degree of differential linearity. The non-spectroscopy ADC 32 in FIG. 3 outputs a 12-bit digital input signal in line 36. The 12-bit digital input signal inputs the data transformer 34. The data transformer 34 preferably outputs an 8-bit digital binning signal in line 27. The 8-bit digital binning signal in line 27 can then be input to an add-one circuit 28 as shown in FIG. 1. As shown in FIG. 1, which is a hardware implemented spectroscopy binning scheme, the digital binning signal inputs the add-one circuit 28, and the add-one circuit 28 outputs a digital instruction in line 29 to increment histogram data stored in a channel in the memory 31 which has an address corresponding to information contained in the digital binning signal. There are, of course, many ways known in the art to increment histogram data stored in the channels of memory 31 in accordance with digital binning signals. The invention is not limited to a system using an add-one circuit 28 for carrying out the binning schemes. For example, a system using a buffer and a microprocessing unit can be used, and such a system is discussed later in connection with FIGS. 8 and 9.

The data transformer 34 is preferably an EPROM transform table in which the value of each digital input signal in line 36 corresponds to a value for a digital binning signal that is output in line 27. In a general sense, the EPROM transform table provides a transfer function that maps the digital input signals in line 36 into digital binning signals in line 27. The purpose of the data transformer 34 is to provide a histogram 30 that is easy to analyze by the user. For instance, in gamma ray spectroscopy, the histogram 30 consists of a plot in which the number of gamma rays measured by the system at a particular energy (e.g. an energy range spanning a 0.5 to 2 keV interval) are plotted over the entire energy range of interest (e.g. 0 to 2000 keV). In a system with a sodium iodide detector, the appropriate data transformer 34 would implement a square root transfer function, or some similar function. The square root transfer function is particularly useful in a sodium iodide spectroscopy system because all of the peaks in the displayed histogram 30 will have the same (or approximately the same) width or resolution as measured by the full width at half maximum (FWHM). In addition, the square root transfer function combines or compresses the twelve bit digital input values (4096 channels) into eight bit digital binning values (256 channels). This compression of data accounts for poor detector resolution, with respect to energy, of the measured gamma rays. Thus, the location and magnitude of gamma ray peaks on the histogram 30 can be easily identified without requiring the use of expensive spectroscopy grade ADCs, and/or extensive data analysis.

System performance can be further improved by modifying the transfer function to also characterize repeatable non-linearities in the system. For instance, unless very high quality detectors 14 are used, the emitted gamma rays 16 sensed by the detector 14 do not normally correlate precisely with the histogram data due mostly to integral non-linearities in the detector 14. However, for any particular detector 14 and/or associated electronics (e.g. preamplifier 20, shaping amplifier 22, pulse stretcher 24), integral non-linearities are often repeatable.

Figure 4:
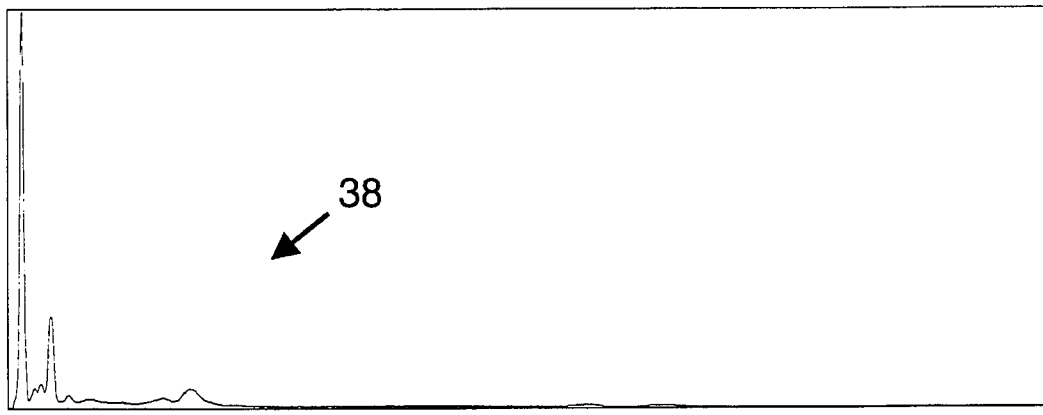
FIG. 4 is a histogram of a Ba133 and Co60 spectrum taken by a prior art sodium iodide spectroscopy system having an 8192 channel Wilkinson ADC.
Figure 5:
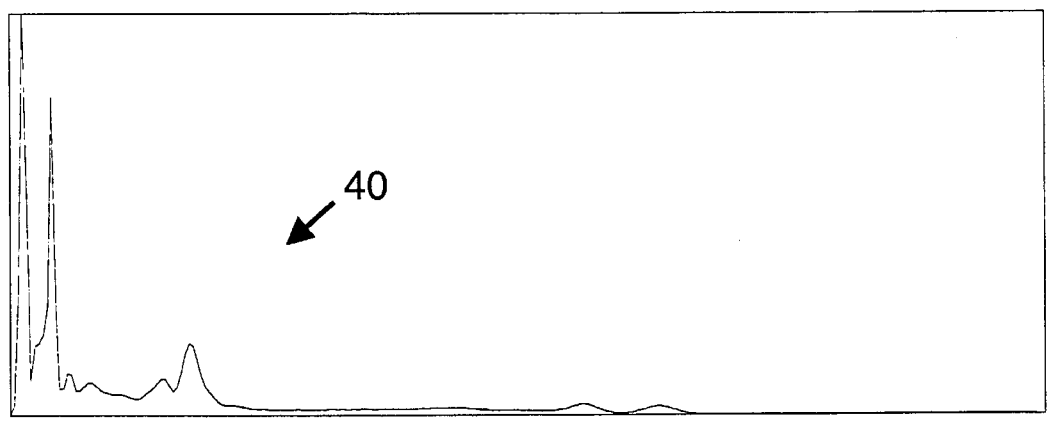
FIG. 5 is a histogram of a Ba133 and Co60 spectrum taken by a prior art sodium iodide spectroscopy system having a 256 channel Wilkinson ADC, using the same data as in FIG. 4.
Figure 6:
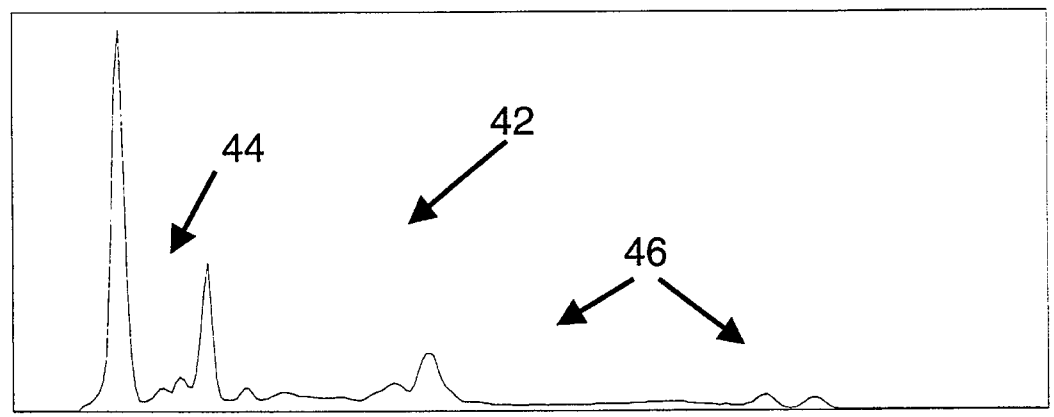
FIG. 6 is a histogram of a Ba133 and Co60 spectrum taken in a sodium iodide spectroscopy system with the analog to digital conversion technique shown in FIG. 3 as in accordance with the invention, using the same data as in FIGS. 4 and 5.

FIGS. 4–6 are histograms generated from a source of radiation consisting of isotopes Ba133 and Co60 using sodium iodide spectroscopy. Each of the histograms or spectra shown in FIGS. 4, 5 and 6 were generated from exactly the same data. The histogram 38 shown in FIG. 4 was generated using a very high resolution spectroscopy grade ADC (i.e. 8,192 channels with differential non-linearity of less than 1% per channel). In the histogram 38 of FIG. 4, it is difficult or even impossible to identify and quantify peaks in the middle and higher energy ranges. This is because the data is spread over too many channels. The histogram 40 shown in FIG. 5 was generated by a low resolution spectroscopy grade ADC (i.e. 256 channels with a differential linearity of less than 1% per channel). The histogram 40 in FIG. 5 shows peaks in the middle and higher energy ranges better than the histogram in FIG. 4, however, the low energy peaks are distorted and merged together.

The histogram 42 in FIG. 6 was generated using a 4096 channel non-spectroscopy ADC (i.e. 4096 channels with ±1 least significant bit differential non-linearity) and a data transformer implementing a square root transform function in accordance with the invention. The histogram 42 in FIG. 6 shows all of the peaks in the histogram 42 with comparable clarity. This results from the use of a square root transfer function because, in a sodium iodide spectroscopy system, the square root transfer function approximates the transform required for all the peaks in the histogram 42 to have the same width. In addition, the shape of the peaks are accurate over the entire energy spectrum even though a non-spectroscopy ADC (i.e., an ADC having relatively poor differential linearity) was used to generate the histogram. The accuracy of the histogram 42 in FIG. 6 taken in accordance with the invention can be verified by comparing the spectra 44 in the low energy ranges of FIG. 6 to the histogram 38 shown in FIG. 4 taken by the system using the high resolution spectroscopy grade ADC, and also comparing the spectra 46 in FIG. 6 in the middle to high energy range to the histogram 40 shown in FIG. 5 generated by the system having the low resolution spectroscopy grade ADC.

Figure 7:
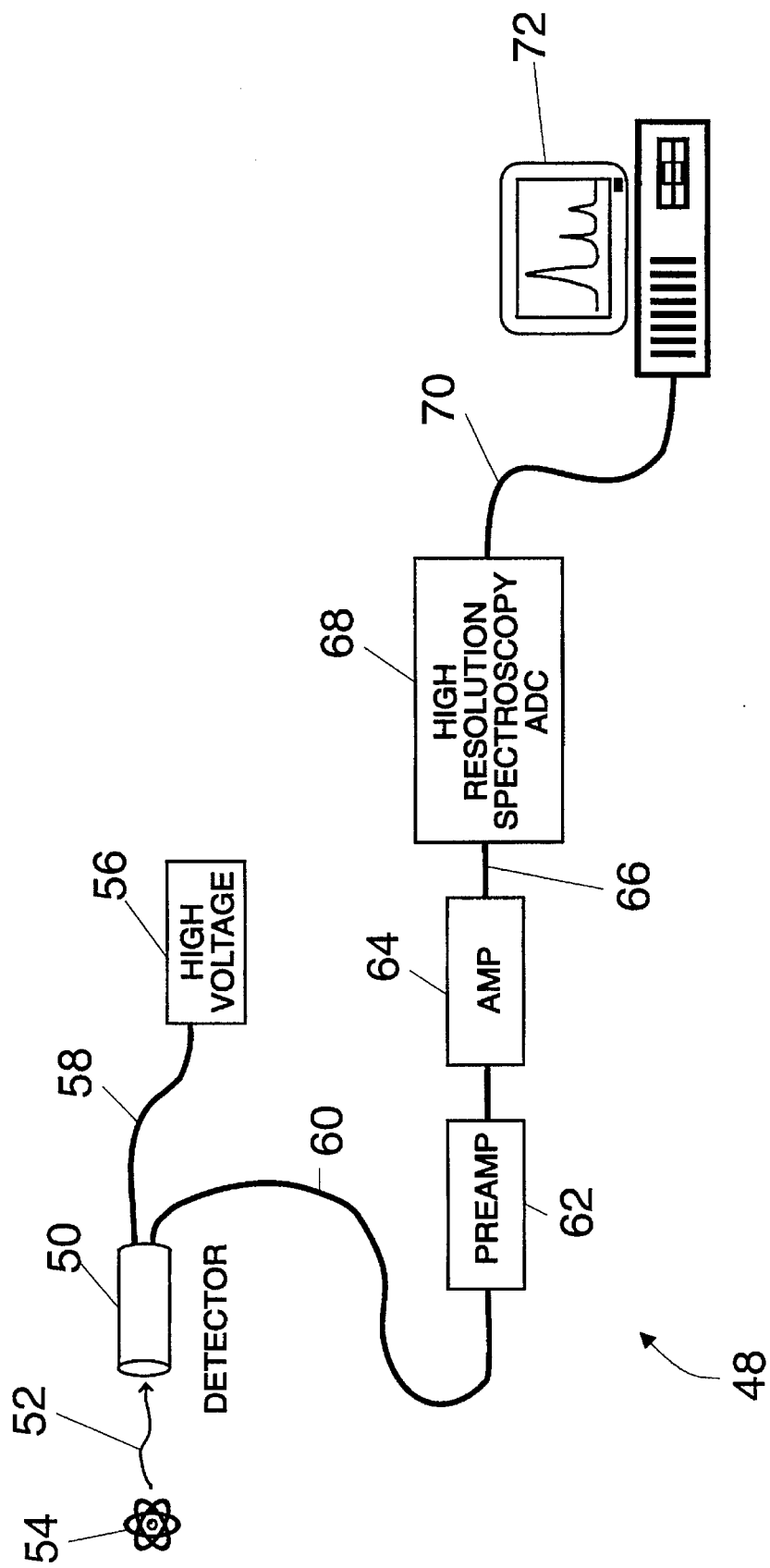
FIG. 7 is a schematic diagram of a system for determining a transfer function used in the analog to digital conversion technique shown in FIG. 3.

FIG. 7 shows a system 48 for determining a transfer function that characterizes the energy dependence of the resolution of a nuclear spectroscopy system as a function of energy, as well as characterizing repeatable non-linearities in the spectroscopy system. In particular, the system 48 shown in FIG. 7 determines a transfer function for the detector 50. The transfer function can vary among different types of detectors (e.g. sodium iodide scintillation detectors versus plastic scintillation detectors), and can also vary depending on detector geometry or with respect to other features of the detector.

In the transfer function determination system 48 shown in FIG. 7, a detector 50 senses a plurality of gamma rays 52 from a known source of radiation 54. The known source of radiation 54 should provide gamma rays 52 that occur across the full energy range of interest for the spectroscopy system in which the detector 50 will be used. For instance, Eu152 is a suitable source of known radiation 54. A power supply 56 supplies power to the detector 50 through line 58. The detector 50 outputs an analog pulse signal in line 60 in response to each gamma ray 52 sensed by the detector 50. The analog pulse signal in line 60 is amplified, shaped and stretched, or otherwise modified, as represented by blocks 62 and 64 to provide an analog pulse signal in line 66 of sufficient quality to be input to a high resolution spectroscopy grade analog to digital converter 68. The high resolution spectroscopy grade ADC 68 (e.g., 12 to 14-bit less than 1% differential non-linearity) converts the analog pulses in line 66 into digital binning signals in line 70. The digital binning signals in line 70 input a computer 72 in which data is stored in a plurality of memory channels in accordance with the digital binning signals. The transfer function is developed by matching the stored data with an ideal spectrum for the known source of radiation 54, and by scaling the stored data so that the width of peaks in a histogram created by the stored data are constant over the energy range of interest.

As shown in FIG. 3, the determined transfer function can be implemented as an EPROM transform table in the data transformer 34.

Figure 8:
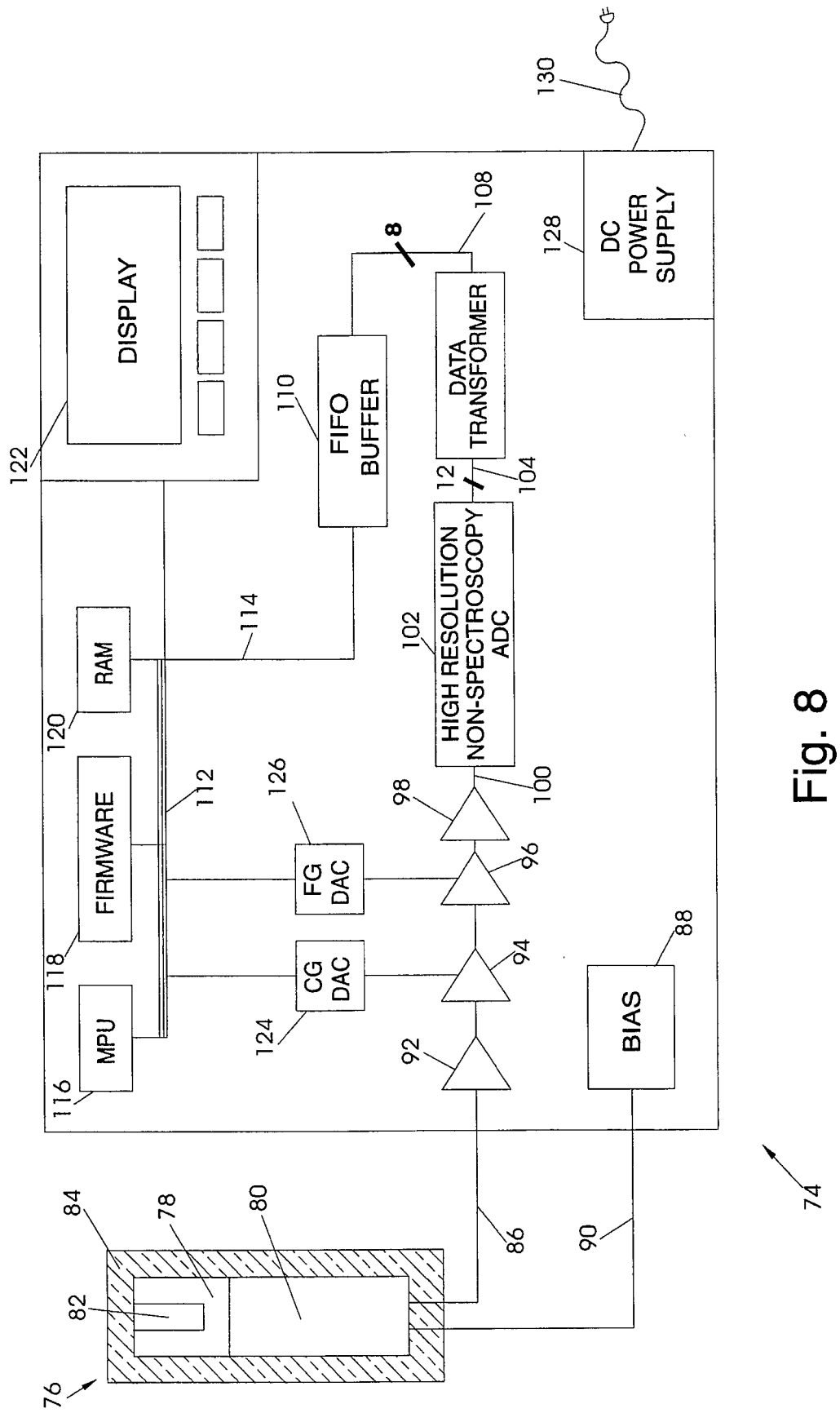
FIG. 8 is a schematic diagram of a spectroscopy system in accordance with the invention that is preferably used for detecting low levels of radiation.

FIG. 8 shows a low level radiation detection system 74 in accordance with the invention that can be used to test samples for radiation. The purpose of such a low level radiation detection system 74 is normally to determine whether radioactive material is present in a sample; and, if radiation is present, what isotope and how much radiation are present. The system 74 shown in FIG. 8 would be particularly useful for detecting radiation from wipe test samples. Wipe test systems normally require good sensitivity over a large range of energy, and system 74 shown in FIG. 8 can provide these results. The system 74 could also be used in many other applications such as food testing, waste disposal, waste clean-up, and medical tests such as whole body assay.

In FIG. 8, the system 74 has a shielded well detector 76. The shielded well detector 76 preferably has a sodium iodide crystal 78, and a photo multiplier tube 80. The crystal 78 has a well 82 in which a sample being tested for radiation is placed. A shield 84; preferably made of lead, encases the detector components 76 and the sample in the well 82. When a gamma ray from the sample hits the sodium iodide crystal 78, a pulse of light is emitted. The photo multiplier tube 80 amplifies the pulse of light, and generates an analog pulse signal in line 86 in response. A bias voltage supply 88 provides a bias voltage to the detector 76 through line 90.

The analog pulse signal in line 86 is amplified in preamplifier 92, shaped in shaping amplifiers 94 and 96 and stretched in stretching amplifier 98 to generate an analog pulse signal in line 100 having sufficient quality to input an ADC. The analog pulse signal in line 100 inputs ADC 102 which is preferably a high resolution, non-spectroscopy grade channel ADC (i.e. 4096 channels with ±1 least significant bit differential non-linearity). The high resolution non-spectroscopy ADC 102 outputs a 12-bit digital input signal in line 104. The 12-bit digital input signal in line 104 inputs a data transformer 106, which is preferably an EPROM implementing a transform table. The data transformer outputs an 8-bit digital binning signal in line 108. The digital binning signal in line 108 inputs a first-in-first-out (FIFO) buffer 110. The output of the buffer 110 is connected to a data bus 112 via line 114 to provide communication between the buffer 110 and the data bus 112. Also, connected to the data bus 112 are a microprocessing unit 116, read-only memory 118 (i.e., firmware), random access memory 120, and a user interface 122 including a screen display for the histogram. The buffer 110 temporarily stores the digital binning signals. When the buffer 110 is half full, an interrupt is sent to the microprocessing unit 116 and the microprocessing unit 116 starts reading data from the buffer 110. The microprocessing unit 116 uses the 8-bit digital binning signal as a pointer to an address of a memory channel in the RAM 120. The RAM 120 preferably has 256 channels corresponding to the 8-bits in the digital binning signals. Each of the 256 channels in RAM are incremented by a count of one by the microprocessing unit when the digital binning signal from the buffer 110 in line 114 corresponds to the address of the channel. A histogram 30 can be displayed on the display screen by instructing the microprocessing unit 116 to dump the information in the channels of RAM 120 onto the display screen of the user interface 122.

In the preferred system 74, the first shaping amplifier 94 has a course gain adjustment and the second shaping amplifier 96 has a fine gain adjustment. The microprocessing unit 116 provides instructions for these gain adjustments to shaping amplifiers 94, 96 through a course gain digital to analog converter 124 and a fine gain digital to analog converter 126, respectively. The system 74 also preferably has a DC power supply 128 which receives conventional AC power from an AC power source through cord 130.

Figure 9:
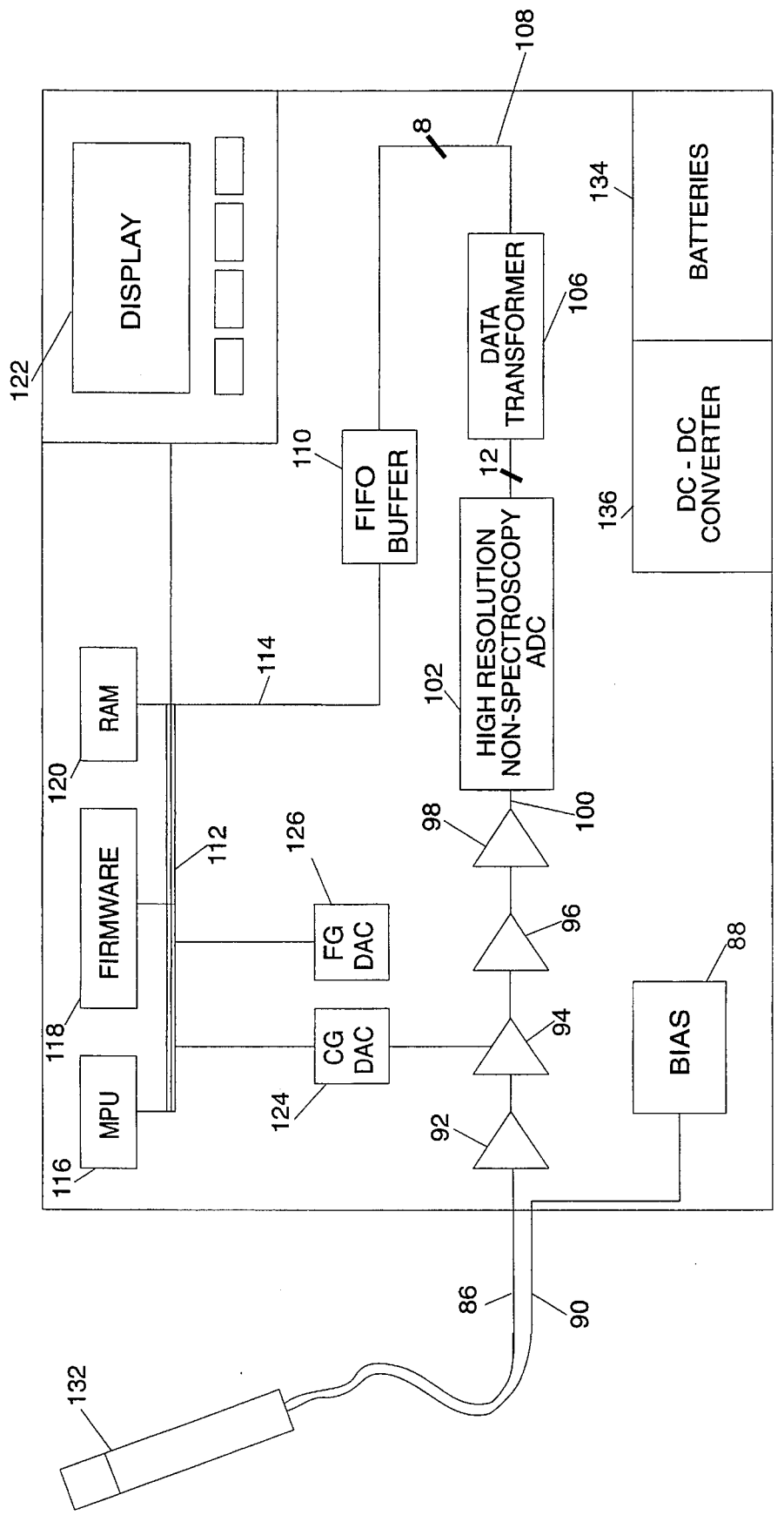
FIG. 9 is schematic diagram of a portable spectroscopy system in accordance with the invention that can be used as a field survey instrument.

The system 131 shown in FIG. 9 is a portable spectroscopy system that is useful for providing in situ radiation measurements. Such a portable system 131 eliminates the need for taking an excessive amount of samples back to a laboratory for analysis. The portable system 131 is similar in many respects to the system 74 described in FIG. 8, and like reference numbers are used to facilitate understanding. The portable system 131 in FIG. 9 has a hand-held detector 132 which is preferably a sodium iodide detector. The portable unit 131 also carries batteries 134 to power the unit. A DC to DC converter 136 is provided to regulate the voltage from the batteries 134 for the electronics in the portable system 131. In other respects, the portable system 132 is essentially the same as the system 74 shown in FIG. 8 with the exception of physical size of the user interface 122. It should be appreciated that the invention is particularly useful for a portable system 132 because the invention allows quick determination of the location and magnitudes of peaks along the energy spectrum. FIGS. 3, 8 and 9 show a digital circuit embodiment of the invention.

Figure 10:
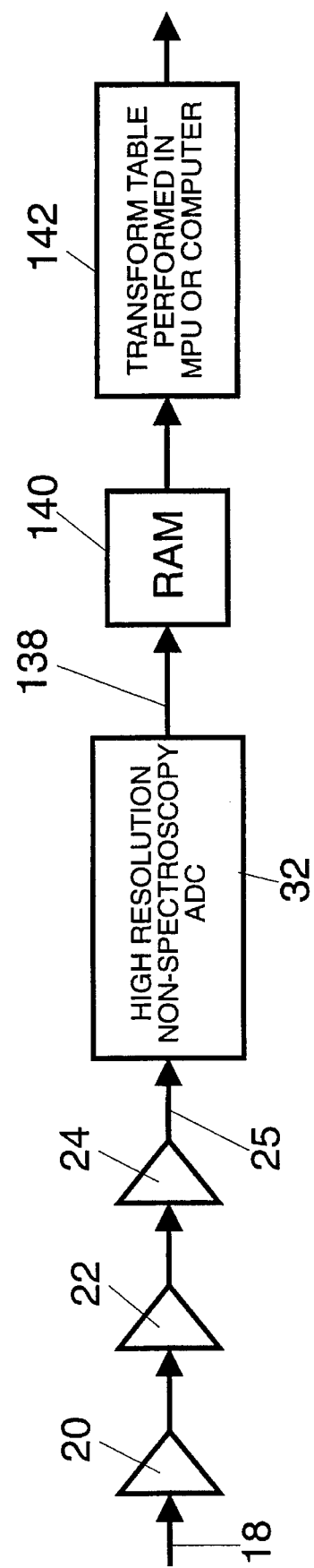
FIG. 10 is a block diagram of a firmware or software embodiment of the analog to digital conversion technique of the invention.

FIG. 10 shows a software and/or firmware embodiment of the invention. In FIG. 10, an analog pulse signal from a detector is present in line 18. The analog pulse signal is amplified, shaped and stretched in preamplifier 20, shaping amplifier 22 and pulse stretcher 24 to generate an analog pulse signal of sufficient quality to input an ADC. The analog pulse signal in line 25 inputs a high resolution, non-spectroscopy grade ADC 32 (i.e. 4096 channels with ±1 least significant bit differential non-linearity). The ADC 32 preferably converts the analog pulse signal to a 12-bit digital input signal that is output in line 138. The digital input signal in line 138 from the ADC 32 is used to increment data stored in a channel in RAM 140 having an address corresponding to information contained in the digital input signal. The RAM 140 would have 4096 memory channels in this example. The data stored in the memory channels can be incremented any number of ways including the use of an add-one circuit such as shown in FIG. 1, or the use of a microprocessor-based scheme as shown in FIGS. 8 and 9. The data stored in RAM 140 can then be transformed into histogram data by a data transformer 142 before being displayed on the screen display of the user interface. The data transformer 142 can be a transform table performed in a microprocessing unit or by software in a computer. The data transformer 142 maps the data in the memory channels through a transfer function that characterizes the energy dependence of the resolution of the system, and preferably repeatable non-linearities in the system, as a function of energy to generate the histogram data.

Figure 11:
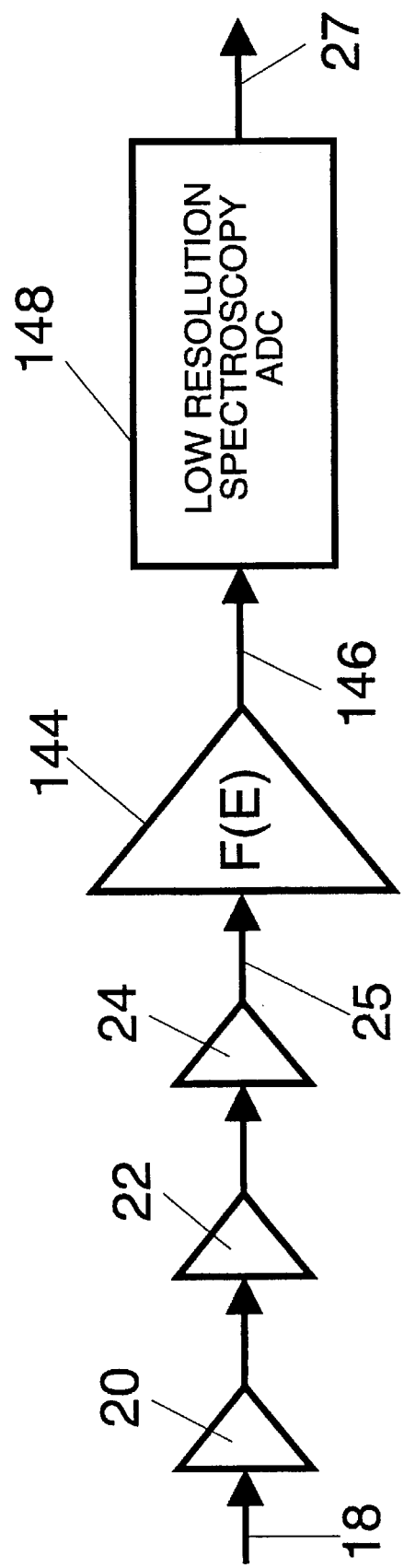
FIG. 11 is a block diagram of an analog circuit embodiment of an analog to digital conversion technique of the invention.

FIG. 11 shows an analog circuit embodiment of the invention. In FIG. 11, an analog pulse signal from a detector in line 18 is amplified, shaped and stretched to generate analog pulse signal in line 25 that is sufficient to input an ADC converter. The analog pulse signal in line 25 inputs a special function analog circuit 144. The special function analog circuit 144 implements the transfer function that characterizes the dependence of the resolution of the system as a function of energy. In this analog circuit embodiment, it is normally not practical for the transfer function to additionally characterize repeatable non-linearities in the system. In a system having a sodium iodide detector, the special function analog circuit would preferably implement a square root transfer function. The special function analog circuit outputs an analog binning signal in line 146. The analog binning signal in line 146 inputs an ADC 148. The ADC 148 is preferably a low resolution spectroscopy grade ADC (i.e. 128–512 channels with a differential linearity of less than 1% per channel). The low resolution spectroscopy grade ADC 148 outputs a digital binning signal in line 27. The digital binning signal in line 27 is used to increment histogram data stored in memory channels in RAM 31 having an address corresponding to the information contained in the digital binning signal. Incrementing the histogram data stored in the memory channels of RAM 31 can be accomplished as described with an add-one circuit 28 in FIG. 1, or as described with a microprocessor in FIGS. 8 and 9. The histogram data in the RAM 31 can then be displayed on a screen display 30.

While the invention has been described in connection with gamma ray spectroscopy systems, the invention should not be limited to gamma ray spectroscopy. The invention is useful for other types of nuclear spectroscopy, as well as non-nuclear spectroscopy. In general, any spectroscopy system having resolution which can be defined as a function of a measured characteristic parameter can implement the invention.

It is recognized that various equivalents, alternatives, and modifications or possibles should be considered to be within the scope of the appended claims.

I claim:

1. In a nuclear spectroscopy system, a method of spectroscopy comprising the steps of:

sensing a plurality of gamma rays from a source of radiation;

generating a signal for each gamma ray sensed in which the magnitude of the signal represents a measured value for the energy of the gamma ray;

mapping the generated signals through a transfer function to generate binning signals, the transfer function characterizing the energy dependence of the resolution of the system as a function of gamma ray energy; and storing histogram data in a plurality of memory channels in accordance with the binning signals.

2. A method as recited in claim 1 wherein the transfer function also characterizes one or more repeatable non-linearities in the system.

3. A method as recited in claim 1 further comprising the step of displaying the histogram data.

4. A method as recited in claim 1 wherein all of the peaks in the histogram data have approximately the same width.

5. A method as recited in claim 1 wherein:

analog pulse signals are generated in response to each gamma ray sensed;

the analog pulse signals are mapped through the transfer function to generate analog binning signals;

the analog binning signals are converted into digital binning signals; and the histogram data is stored in the plurality of memory channels in accordance with the digital binning signals.

6. A method as recited in claim 1 wherein:

analog pulse signals are generated in response to each gamma ray sensed;

the analog pulse signals are converted into digital input signals;

the digital input signals are mapped through the transfer function to generate digital binning signals; and the histogram data is stored in the plurality of memory channels in accordance with the digital binning signals.

7. In a nuclear spectroscopy system, a method of spectroscopy comprising the steps of:

sensing a plurality of gamma rays from a source of radiation and generating an analog pulse signal in response to each gamma ray sensed, the magnitude of the pulse representing a measured value for the energy of the gamma ray sensed;

converting the analog pulse signals into digital input signals;

storing conventional histogram data in a plurality of memory channels in accordance with the digital input signals; and mapping the conventional histogram data in the plurality of memory channels through a transfer function to generate transformed histogram data, the transfer function characterizing the energy dependence of the resolution of the system as a function of gamma ray energy.

8. A method as recited in claim 7 wherein the transfer function also characterizes one or more repeatable non-linearities in the system.

9. A method as recited in claim 7 further comprising the step of displaying the transformed histogram data on a screen display.

10. A method as recited in claim 7 wherein all of the peaks in the transformed histogram data have approximately the same width.

11. A method of determining a transfer function that characterizes the energy dependence of the resolution of a nuclear spectroscopy system as a function of energy, the method comprising the steps of:

sensing a plurality of gamma rays from one or more known sources of radiation in which gamma rays occur across the full energy range of interest;

generating an analog pulse signal in response to each gamma ray sensed, the magnitude of the pulse representing a measured value for the energy of the gamma ray sensed;

converting the analog pulse signals into digital binning signals with a spectroscopy grade analog to digital converter having a high degree of differential linearity;

storing conventional histogram data in a plurality of memory channels in accordance with the digital binning signals; and developing the transfer function by matching the stored conventional histogram data to an ideal spectrum for the known one or more sources of radiation, and scaling the conventional histogram data so that the width of peaks are constant across the energy range of interest.

12. A method as recited in claim 11 wherein the transfer function is further modified to characterize one or more repeatable non-linearities in the system.

13. A nuclear spectroscopy system comprising:

a detector that sense radiation energy and outputs an analog pulse signal;

an analog to digital converter that inputs the analog pulse signal and outputs a digital input signal;

a data transformer that inputs the digital input signal, applies a non-linear transform to the digital input signal, and outputs a digital binning signal; and a memory that stores histogram data in memory channels wherein the digital binning signal from the data transformer is used to increment histogram data stored in the memory channel having an address corresponding to information contained in the digital binning signal.

14. A system as recited in claim 13 further comprising a screen display for displaying histogram data stored in the memory.

15. A system as recited in claim 13 wherein the detector is a sodium iodide scintillation detector.

16. A system as recited in claim 13 further comprising:

a buffer that temporarily stores the digital binning signals;

a microprocessing unit; and a data bus providing communication between the buffer, the memory, and the microprocessing unit.

17. A system as recited in claim 13 further comprising:
an add-one circuit that inputs the digital binning signal and outputs a digital instruction to increment histogram data stored in a memory channel having an address corresponding to information contained in the digital binning signal.

18. A system as recited in claim 13 wherein the data transformer comprises a transform table that correlates the digital input signal to a corresponding digital binning signal.

19. A system as recited in claim 13 wherein the data transformer comprises a transform function that characterizes the energy dependence of the resolution of the system as a function of energy.

20. A system as recited in claim 19 wherein the transfer function also characterizes one or more repeatable non-linearities in the system.

21. A system as recited in claim 13 wherein the system is a portable spectroscopy system which further comprises:
a battery that provides direct current power for the system.

22. A system as recited in claim 13 wherein the system is used to test samples for radiation and the detector is a shielded well detector having a well for receiving the sample.

23. A nuclear spectroscopy system comprising:
a detector that senses radiation energy and outputs an analog pulse signal;
a special function analog circuit that inputs the analog pulse signal and outputs an analog binning signal;
an analog to digital converter that inputs the analog binning signal and outputs a digital binning signal; and
a memory that stores histogram data in memory channels wherein the digital binning signal from the analog to digital converter is used to increment histogram data stored in a memory channel having an address corresponding to information contained in the digital binning signal.

24. A system as recited in claim 23 further comprising a screen display for displaying the histogram data stored in the memory.

25. A system as recited in claim 23 wherein the detector is a sodium iodide detector and the special function analog circuit implements a square root transfer function.

26. A nuclear spectroscopy system comprising:
a detector that senses radiation energy and outputs an analog pulse signal;
an analog to digital converter that inputs the analog pulse signal and outputs a digital input signal;
a memory that stores conventional histogram data in memory channels wherein the digital input signal from the analog to digital converter is used to increment data stored in a memory channel having an address corresponding to information contained in the digital input signal; and
means for transforming the conventional histogram data in the memory channels into transformed histogram data, the transforming means mapping the conventional histogram data in the memory channels through a transfer function that characterizes the energy dependence of the resolution of the system as a function of energy to generate the transformed histogram data.

27. A system as recited in claim 26 further comprising a screen display for displaying the transformed histogram data.

28. A system as recited in claim 26 wherein the transfer function also characterizes one or more repeatable non-linearities in the system.

29. In a spectroscopy system, a method of spectroscopy comprising the steps of:
sensing a plurality of events;
generating a signal for each event sensed in which the magnitude of the signal represents a measured value for a characteristic parameter associated with the event;
mapping the generated signals through a transfer function to generate binning signals, the transfer function characterizing the resolution of the system as a function of the characteristic parameter;
storing histogram data in a plurality of memory channels in accordance with the binning signals.

30. A method as recited in claim 29 wherein the transfer function also characterizes one or more repeatable non-linearities in the system.

31. A method as recited in claim 30 wherein the spectroscopy system is a nuclear spectroscopy system, the sensed plurality of events are a sensed plurality of radiation decay events from a source of radiation, and the magnitude of the generated signal for each sensed decay event represents a measured value for an energy associated with the sensed decay event.

32. In a spectroscopy system, a method of spectroscopy comprising the steps of:
sensing a plurality of events and generating an analog pulse signal in response to each event sensed, the magnitude of the pulse representing a measured value for a characteristic parameter associated with the event;
converting the analog pulse signals into digital input signals;
storing conventional histogram data in a plurality of memory channels in accordance with the digital input signals;
mapping the conventional histogram data in the plurality of memory channels through a transfer function to generate transformed histogram data, the transfer function characterizing the resolution of the system as a function of the characteristic parameter.

33. A method as recited in claim 32 wherein the transfer function also characterizes one or more repeatable non-linearities in the system.

34. A method as recited in claim 32 wherein the spectroscopy system is a nuclear spectroscopy system, the sensed plurality of events are a sensed plurality of radiation decay events from a source of radiation, and the magnitude of the pulse for each sensed decay event represents a measured value for an energy associated with the sensed decay event.

* * * * *